United States Patent
Li et al.

(10) Patent No.: US 7,632,880 B2
(45) Date of Patent: Dec. 15, 2009

(54) HIGH REFRACTIVE INDEX POLYMERIZABLE COMPOSITIONS

(75) Inventors: Zhi Li, Swindon (GB); Rifat Iqbal, Swindon (GB); Jun Wang, Swindon (GB)

(73) Assignee: Microsharp Corporation Ltd., Swindon (GB)

( * ) Notice: Subject to any disclaimer, the term of this patent is extended or adjusted under 35 U.S.C. 154(b) by 555 days.

(21) Appl. No.: 10/545,963

(22) PCT Filed: Feb. 20, 2004

(86) PCT No.: PCT/GB2004/000667

§ 371 (c)(1), (2), (4) Date: May 2, 2006

(87) PCT Pub. No.: WO2004/074884

PCT Pub. Date: Sep. 2, 2004

(65) Prior Publication Data

US 2006/0241220 A1    Oct. 26, 2006

(30) Foreign Application Priority Data

Feb. 21, 2003   (GB) ................ 0304011.0

(51) Int. Cl.
| | |
|---|---|
| *C08K 5/49* | (2006.01) |
| *C08K 5/50* | (2006.01) |
| *C08K 5/51* | (2006.01) |
| *C08K 5/52* | (2006.01) |
| *C08K 3/08* | (2006.01) |
| *C08K 5/00* | (2006.01) |
| *C08F 2/46* | (2006.01) |
| *C08J 3/28* | (2006.01) |
| *B05D 5/02* | (2006.01) |
| *B05D 5/06* | (2006.01) |

(52) U.S. Cl. ............... 524/115; 524/80; 524/81; 524/123; 524/126; 524/128; 524/129; 524/130; 524/174; 524/175; 524/176; 524/177; 522/74; 522/76; 522/81; 522/82; 522/100; 522/103; 522/104; 522/107; 522/150; 522/153; 522/152; 522/171; 522/170; 522/168; 522/178; 522/181; 522/182; 427/162; 427/163.1; 427/163.3; 359/896

(58) Field of Classification Search ............ 522/74, 522/76, 81, 82, 100, 103, 104, 107, 150, 522/153, 171, 170, 168, 178, 181, 182; 524/80, 524/81, 115, 130, 128, 129, 126, 123, 174, 524/175, 176, 177; 427/162, 163.1, 163.3; 359/896

See application file for complete search history.

(56) References Cited

U.S. PATENT DOCUMENTS

| | | | | |
|---|---|---|---|---|
| 3,564,601 A | * | 2/1971 | Witt et al. ............ | 558/165 |
| 4,593,128 A | * | 6/1986 | Hinney et al. ......... | 568/701 |
| 4,670,479 A | * | 6/1987 | Miyauchi .............. | 524/154 |
| 4,835,202 A | * | 5/1989 | Pastor et al. .......... | 524/154 |
| 5,362,783 A | * | 11/1994 | Eiffler et al. ......... | 524/154 |
| 5,494,952 A | * | 2/1996 | Hirata et al. .......... | 524/139 |

(Continued)

*Primary Examiner*—Sanza L McClendon
(74) *Attorney, Agent, or Firm*—Bacon & Thomas, PLLC (57) ABSTRACT

The invention provides a single phase, essentially solvent-free polymerizable liquid composition comprising a polymerizable liquid with dissolved therein an organogroup 4, 5 or 6 compound selected from the group consisting of organolead, organophosphorus, organoarsenic, organoantimony, organobismuth and organselenium compounds, said position being polymerizable under the action of an externally applied influence.

13 Claims, 1 Drawing Sheet

U.S. PATENT DOCUMENTS

| | | | |
|---|---|---|---|
| 5,668,202 A * | 9/1997 | Hirata et al. | 524/154 |
| 5,702,825 A * | 12/1997 | Keita et al. | 428/500 |
| 5,744,526 A * | 4/1998 | Goossens et al. | 524/90 |
| 6,225,021 B1 | 5/2001 | Widawski et al. | |
| 6,319,603 B1 | 11/2001 | Watanabe et al. | |
| 6,836,371 B2 * | 12/2004 | Lai et al. | 359/642 |
| 6,934,088 B2 * | 8/2005 | Lai et al. | 359/655 |
| 6,976,641 B2 * | 12/2005 | Lai et al. | 239/398 |
| 7,304,102 B2 * | 12/2007 | Yan et al. | 523/427 |
| 7,420,743 B2 * | 9/2008 | Lai et al. | 359/642 |
| 2002/0045689 A1 | 4/2002 | Henry et al. | |
| 2002/0123589 A1 * | 9/2002 | Olson et al. | 526/286 |
| 2004/0008319 A1 * | 1/2004 | Lai et al. | 351/159 |
| 2005/0046957 A1 * | 3/2005 | Lai et al. | 359/652 |
| 2005/0057815 A1 * | 3/2005 | Lai et al. | 359/652 |
| 2005/0064105 A1 * | 3/2005 | Lai et al. | 427/504 |
| 2006/0189788 A1 * | 8/2006 | Araki et al. | 528/425 |
| 2007/0037906 A1 * | 2/2007 | Kawato et al. | 524/154 |
| 2008/0026205 A1 * | 1/2008 | Sasaki et al. | 428/323 |
| 2008/0254210 A1 * | 10/2008 | Lai et al. | 427/162 |

\* cited by examiner

FIG. 1

HIGH REFRACTIVE INDEX POLYMERIZABLE COMPOSITIONS

This invention relates to polymerizable compositions, to a method of polymerizing such compositions, and to polymer products prepared using such compositions, in particular optical films, coatings, adhesives, lenses and fibres.

The flat panel display, optoelectronic and photonic industries all require high refractive index optical grade polymers, such as films, coatings, lacquers and adhesives, for use in applications such as lenses, display screens and photonic packaging.

The refractive index is an important property of an optical material and is related to how effectively an optical material controls the flow of light. High refractive index vinyl group monomers, for example (meth)acrylates, can be polymerised to form polymer products capable of modifying or controlling the flow of light.

Brightness enhancement films (BEF) used in liquid crystal display (LCD) backlights increase the brightness of the display and afford benefits such as reduced power consumption and long battery life. In the case of an optical film, increased refractive index results in increased perceived brightness of the light transmitted through the film.

Accordingly, if the refractive index of the optical film is increased, either a brighter display can be achieved or the battery life of the device incorporating the optical film may be prolonged. Battery life is an ongoing concern, especially for portable electronic products.

There thus exists a continuing need for improved high refractive index polymeric optical materials and polymeric optical products, i.e. products and materials of carbonaceous polymers.

Polymeric materials prepared from monomers containing aromatic rings typically have high refractive indices.

Halogen substitution in aromatic or aliphatic monomers has also been found to increase the refractive index of the resultant polymeric materials. U.S. Pat. Nos. 4,721,377 and 4,812,032 use a vinyl copolymer with halogen-substituted aromatic rings to provide an optical product having a high refractive index. JP184210/1984 and 193915/1984 disclose resins based on di(meth)acrylate having a bromine containing bisphenol-A skeleton for the manufacture of optical grade lenses.

Various studies on sulphur-containing resins have recently been reported. It has been claimed that such resins improve refractive index and reduce levels of chromatic dispersion.

Polymer compositions based mainly on methyl methacrylate are also used as optical resins but their refractive indices can be as low as 1.50.

Various other crosslinkable monomers have been proposed for the production of high refractive index resins. For example, EP273710 proposes polyfunctional thiomethacrylates as a starting monomer for synthetic routes to resins of high refractive index. However the polyfunctional thiomethacrylates are technically difficult to produce and the speed of polymerisation is difficult to control. JP01-128966 discloses a (meth)acrylate-based polymerizable monomer having a sulphide structure. JP04-161410 discloses (meth)acrylate-based polymers also containing dithian rings with such polymers having polymerisable refractive indices in the range 1.57 to 1.61, which are a little higher than the conventional products.

We have now found that the refractive index of optical grade polymers may be increased by the incorporation into the polymer of organo-group 4, 5 or 6 compounds selected from organolead, organophosphorus, organoarsenic, organoantimony, organobismuth, and organoselenium compounds. The use of organonitrogen compounds is not preferred as this may lead to discoloration of the polymer product making it less appropriate for optical uses.

Thus viewed from one aspect the invention provides a single phase, essentially solvent-free polymerizable liquid composition comprising a polymerizable liquid with dissolved therein an organo-group 4, 5 or 6 compound selected from the group consisting of organolead, organophosphorus, organoarsenic, organoantimony, organobismuth, and organoselenium compounds, said composition being polymerizable under the action of an externally applied influence.

The composition of the invention is polymerizable under the action of an externally applied influence, i.e. under ambient temperature and pressure conditions (e.g. 21° C. and 1 bar) it remains in liquid form. Typically the externally applied influence is heat and/or radiation, e.g. electromagnetic radiation such as light, especially UV light, or electrically charged radiation, e.g. an electron beam. Particularly preferably the polymerization reaction is one which proceeds via the formation of free radicals.

Polymerization reactions triggered by such externally applied influences are well known in the art.

The composition of the invention is essentially solvent-free. By this is meant that the polymerization reaction will produce a polymer product which is free of entrapped solvent droplets and which does not comprise separable polymer and liquid solvent phases. In general, the polymerizable liquid (e.g. monomer and/or oligomer) will serve as a solvent for the remaining components of the composition, in particular the organo-group 4, 5 or 6 compound and any polymerization initiator, catalyst or co-catalyst.

The composition of the invention may be an optical adhesive or may be partly cured to form an optical adhesive. Such adhesives may be applied between optical elements, e.g. films or lens components, and used to bond the elements together.

Alternatively viewed, the composition of the invention, in one preferred embodiment, may be seen as a photopolymerisable formulation containing a phosphorus-containing compound, resulting, on polymerization, in a high refractive index material, e.g. formulations containing a phosphorus-containing compound and unsaturated oligomers, for example containing epoxy oligomers and, preferably, unsaturated oligomers. While triphenylphosphine is the preferred phosphorus-containing compound for use in this regard, triphenylphosphite or triphenylphosphine oxide, a diphenyl group 5 compound, a triaromatic phosphine, or a metal:triphenylphosphine complex may likewise be used.

The use of organolead, organoarsenic, organoantimony, organobismuth and organoselenium compounds in polymers and polymerizable compositions, and in particular optical grade polymers, is new and forms a further aspect of the invention. Viewed from this aspect the invention provides a polymerizable liquid composition comprising a polymerizable monomer or oligomer and an organo group 4, 5 or 6 compound selected from organolead, organoarsenic, organoantimony, organobismuth and organoselenium compounds, preferably a single phase composition as defined above.

Likewise the use of organophosphorus compounds in the manufacture of optical grade polymers is new and forms a further aspect of the invention.

The compositions and products of the invention preferably also contain transition metal, lanthanide, or actinide, compounds, preferably organometallic compounds, so as to further enhance the refractive index of the resultant polymer.

Such organo-transition metal, lanthanide or actinide compounds preferably comprise groups having delocalized electron systems, especially aromatic groups. Many such compounds, especially eta-bonded metal complexes, are known as catalyst precursors in the olefin polymerization industry. Where used according to the present invention to enhance refractive index, the compositions will preferably not contain materials such as alumoxanes which serve to activate these to transform them into polymerization catalysts. Such organo-transition metal, lanthanide or actinide compounds may be used in place of, or more preferably in addition to, the organo group 4, 5 or 6 compounds. The use of organonickel or organogold compounds in this regard is especially preferred.

Indeed the scope of the present invention should be viewed as being such as to cover the use, together with or in place of the listed group 4, 5 and 6 compounds, of any organic compound, preferably a compound containing an aromatic group, which contains an element of atomic number 21 or greater, especially 28 to 71, with the exception of the group 9 and 10 elements.

While the compositions of the invention are preferably single phase, it is feasible to include particles or fibres made using such single phase compositions in the composition as on polymerization the optical properties will not be damaged. Such dual phase compositions are considered to be compositions according to the invention.

Viewed from a further aspect the invention provides a process for the preparation of a polymer which process comprises obtaining a polymerizable composition according to the invention and subjecting it to an external influence sufficient to cause said composition to polymerize.

Viewed from a still further aspect the invention also provides a polymer product produced or producible by the process of the invention.

Viewed from a yet still further aspect the invention provides an optical grade polymer product containing a group 4, 5 or 6 element selected from lead, phosphorus, arsenic, antimony, bismuth and selenium.

The product of the invention may be prepared by polymerizing a polymerizable composition containing the organo-group 4, 5 or 6 compound, or alternatively by blending such a compound into a previously prepared polymer.

The polymer products of the invention desirably are in the form of films, coatings, bonding materials (e.g. adhesives), lenses, prisms, light guides, or fibres, especially films, and most especially surface-textured films, e.g. prismatic films. The production of surface-textured films is described for example in U.S. Pat. No. 4,542,449. Films, coatings, bonding materials, lenses and fibres may be prepared by conventional techniques, well known in the art. Such polymer products desirably have a high refractive index, e.g. a refractive index of at least 1.55, preferably 1.55 to 1.67, desirably 1.57 to 1.65, more desirably 1.58 to 1.63, especially 1.59 to 1.61.

The polymer products of the invention may be incorporated into or form part of optical devices such as for example optical display screens, lenses, light transmission systems (e.g. optical cables), etc. Such devices form a further aspect of the present invention. Thus viewed from a further aspect the invention provides an optical device comprising a polymer product according to the invention.

The organo-group 4, 5 or 6 compounds in the compositions of the invention are preferably compounds which, in the concentrations used, do not serve to initiate polymerization of the polymerizable liquid (in the absence of the extremely applied influence) and do not serve to degrade the polymerizable liquid or the resultant polymer in such a way as to damage its optical properties. The organo-group 4, 5 or 6 compound may be a compound which does not participate in the polymerization reaction or alternatively it may be a compound which participates in the polymerization reaction, e.g. as an initiator, co-monomer or cross-linking agent.

The organo-group 4, 5 or 6 compounds in the compositions of the invention are preferably compounds which contain groups having delocalized electron systems, in particular aromatic groups, e.g. 5 to 10 membered rings or fused rings optionally containing a hetero ring-atom (e.g. oxygen) and optionally substituted by halogen atoms (e.g. F, Cl, Br or I atoms) or hydroxy or hydroxymethyl groups. Typical such groups include phenyl, fluorophenyl (e.g. pentafluorophenyl), chlorophenyl (e.g. tetrachlorophenyl), hydroxyphenyl, hydroxymethylphenyl, naphthyl, furyl, etc. Such groups may be attached directly to the group 4, 5 or 6 atom or they may be attached via a linker (e.g. an oxo group). The group 4, 5 or 6 atom is preferably substituted by up to 4 such groups, preferably 2, 3 or 4, particularly 3 such groups, but may be substituted by other carbon-containing or carbon-free groups, e.g. halo atoms, oxygen atoms, metal atoms, sulphur atoms, organosulphur groups and acetyloxy groups. If desired, the organo-group 4, 5 or 6 compounds may contain more than one group 4, 5 or 6 atom, linked by an aromatic or non-aromatic linking group.

Examples of typical organo-group 4, 5 or 6 compounds which may be used according to the invention which are available commercially or which have been described in the literature include: triphenylphosphine (93090); dichlorotriphenylphosphorane (37,875-5); poly(ethylene-glycol) triphenylphosphine (53,264-9); tetrakis(tri-phenylphosphine)nickel(0) (24,499-6); triphenylphosphine dibromide (27,094-6); triphenylphosphine diiodide (41,918-4); triphenylphosphine oxide (T8,460-3); triphenylphosphine selenide (93107); triphenylphosphine sulfide (13,510-0); bis (pentafluorophenyl)phenyl-phosphine (22,196-1); diphenyl (o-tolyl)antimony (55,696-3); tris(1-naphthyl)antimony (S81,820-8); triphenyl-antimony (T8,180-9); triphenyltin sulfide (S39,567-6); triphenyltin chloride (93191); triphenyltin acetate (R28,449-1); diphenylphosphine (25,296-4); diphenyl-phosphine oxide (28,788-1); 2,2'-bis(diphenylphosphino)-1,1'-binaphthalene (48,108-4); (4-hydroxyphenyl)-diphenylphosphine (56,772-8); (oxy-di-2,1-phenylene)bis-(diphenylphosphine) (51,001-7); (1-naphthyl) triphenyltin (S83,073-9); (2,3,4,5-tetrachlorophenyl) triphenyltin (S82,567-0); (2-(hydroxymethyl)phenyl) triphenyllead (S81,497-0); (2-furyl)triphenyllead (S81,310-9); (2-furyl)triphenyltin (S82,476-3); (methylthio)triphenyllead (S41,726-2); and triphenylphosphite. The numbers in brackets in this listing are the compounds' Aldrich catalogue numbers. Further examples include: bis-(acetato-O)triphenylbismuth (7239-60-3); tetrakis(tri-phenylphosphite) nickel(0) (14221-00-2); 1,3-bis(di-phenylphosphino)propane (6737-42-4); benzyldiphenyl-phosphine (7650-91-1); bis(2-diphenylphosphinoethyl)-phenylphosphine (23582-02-7); bis(2-methoxyphenyl)-phenylphosphine (36802-41-2); bis(diphenylphosphino)-acetylene (5112-95-8); bis (diphenylphosphino)methane (2071-20-7); diallylphenylphosphine (29949-75-5); dimethylphenylphosphonite (672-66-2); diphenyl(p-tolyl)-phospine (1031-93-2); diphenyl(trimethylsilyl)phosphine (17154-34-6); tris(2,4,6-trimethylphenyl)phosphine (23897-15-6); tris(4-chlorphenyl)phosphine (1159-54-2); tris(4-fluorophenyl)phosphine (18437-78-0); tris(4-methoxyphenyl)phosphine (4731-65-1); tris(pentafluoro-phenyl)phosphine (1259-35-4); and tris [2-(diphenyl-phosphino)ethyl]phosphine (23582-03-8). The numbers in brackets are the compounds' CAS numbers— these compounds are available from Synor.

The synthesis or commercial availability of other organo-group 4, 5 or 6 compounds may readily be found on the Internet, e.g. triphenylbismuth, triphenylarsine., etc. See for example the Wiley "Eros" (Encyclopaedia of Reagents for Organic Synthesis) site. Further examples of such compounds include trisdimethylaminophosphine, trisdimethylamino phosphite, triphenylantimony, tetraphenylbiphosphine, and diphenyl-2-pyridylphosphine.

If desired, the organo-group 4, 5 or 6 compound may be used in the form of a metal complex, preferably a complex with a relatively heavy metal, e.g. atomic number 28 or above, preferably atomic number 75 or above.

The organo-group 4, 5 or 6 compound is especially preferably an organo-group 5 compound, in particular an organo-phosphorus compound, particularly triphenylphosphine. Organoantimony compounds are also especially preferred, e.g. $(C_6H_5)_3Sb$.

The organo-group 4, 5 or 6 compound is preferably used in a concentration that will increase the refractive index of the resultant polymer. Typically concentrations of up to 60% wt may be used, preferably up to 40% wt, more preferably up to 30o wt, still more preferably up to 2% wt. The minimum concentration used will typically be 1% wt, more preferably 4% wt.

The polymerizable liquid in the compositions of the invention is preferably the precursor for a polyepoxide or more preferably a polyacrylate; however other polymerizable systems, the polymerization whereof is not initiated in the absence of the external influence, may be used if desired. Examples of suitable monomers (or the monomers for suitable oligomers) include: acrylates; methacrylates; epoxides; styrenes; vinyl monomers; methyl styrenes; and the other α-olefinic monomers.

Especially preferably, the polymerizable liquid is a mixture of polymerizable monomers and oligomers. By appropriate selection of the monomer: oligomer weight ratio and of the oligomer molecular weight, the pourability and spreadability of the composition may be optimized and the tendency to loss by evaporation may be reduced. Preferably, the composition is a pourable but viscous liquid.

While the polymerization is typically initiated by the application of heat and/or irradiation, it may involve cationic polymerization, especially where epoxy groups are involved.

Cationic polymerisation is an ionic process involving highly reactive, positively charged polymerisation centres acting as the propagating species. The cationic mechanism may involve the opening of an epoxy group by labile hydrogen to produce a new chemical bond and a hydroxyl group. Such polymerisation is not inhibited by oxygen but is inhibited by bases. The cationic cure rate is governed by the strength of the acid, and the concentration of the acid catalyst, the latter being proportional to the cationic photoinitiator concentration.

The photoinitiator generates a proton on exposure to UV light. The cation causes cycloaliphatic epoxide molecules to cross-link with each other, with hydroxyl compounds, and with vinyl ether compounds.

A cationic polymerization system may thus comprise:
a) a monomer, oligomer or pre-polymer capable of undergoing cationic polymerisation, generally a monomer, oligomer or pre-polymer having at least one epoxide or vinyl ether group;
b) a cationic initiator capable of generating free radicals upon excitation by radiation; and
c) the organo-group 4, 5 or 6 compound.

Examples of cationic polymerisable groups for component (a) include glycidyl groups, cyclic ethers (e.g. alicyclic epoxy groups), cyclic sulphides, cyclic imines, cyclic disulfides, lactones, lactams, cyclic formals, cyclic imino ethers, vinyl ethers and other electron rich vinyl compounds and alcohols in combination with epoxides. Cycloaliphatic epoxides cure cationically more rapidly than glycidyl epoxides. Alcohols and polyols co-react with epoxides by acting as chain transfer agents, generally improving cure speed.

More particularly, examples of cationic polymerisable compounds that could be used as component (a) include: bisphenol A type epoxy resin; bisphenol A epoxy acrylate (e.g. CN104, Sartomer); brominated bisphenol A type resin; bisphenol-AD type epoxy resin; bisphenol-B type epoxy resin; bisphenol-AF type epoxy resin; bisphenol-S type epoxy resin; bisphenol F epoxy resin (e.g. EPALLOY 8220, Hubron); epoxy phenol novolac resin (e.g. EPALLOY 8240, Hubron); modified resorcinol epoxy resin (e.g. ERISYS RF50, Hubron); epoxy novolac modified bisphenol A epoxy resin (e.g. EPALLOY 7138, Hubron); resorcinol epoxy resin (e.g. ERISYS RDGE, Hubron); novolac epoxy resin; epoxy novolac acrylate oligomer (e.g. CN112B70, Sartomer); o-cresol novolac epoxy resin; p-alkylphenol novolac with epichlorohydrin epoxy resin; alicyclic epoxy (e.g. 3,4-epoxy-cyclohexyl-methyl-3,4-epoxycyclohexanecarboxylate, such as EHPE-3150 (UCB)); N,N-diglycidylaniline (Aldrich); diglycidyl 1,2-cyclohexanedicarboxylate (Aldrich); N,N-diglycidyl-4-glycidyloxyaniline (Aldrich); diglycerol polyglycidyl ether; pentaerythritol polyglycidyl ether; trimethylpropane polyglycidyl ether; resorcin diglycidyl ether; 1,6-hexanediol diglycidyl ether; polyethyleneglycol diglycidyl ether; phenyl glycidyl ether; p-t-butyl-phenyl glycidyl ether; dibromophenyl glycidyl ether; dibromopentylglycol digylcidyl ether; 1,2,7,8-diepoxyoctane; 3,4-epoxycyclohexyloxirane; 1,2,5,6-diepoxy-4,7-methanoperhydroindine; 2-(3,4-epoxycyclohexyl)-3',4'-epoxy-1,3-dioxane-5-spirocyclohexane; 1,2-ethylenedioxybis(3,4-epoxycyclohexylmethane);4',5'-epoxy-2'-methylcyclohexylmethyl-4,5-epox y-2-methylcyclohexane carboxylate; ethylene glycol-bis-(3,4-epoxycyclohexane carboxylate); bis-(3,4-epoxycyclohexylmethyl)adipate; di-2,3-epoxycyclopentyl ether; vinyl-2-chloroethyl ether; vinyl-n-butyl ether; triethylene glycol divinyl ether; 1,4-cyclohexanedimethanol divinyl ether; trimethylolethane trivinyl ether; vinyl glycidyl ether; glycidyl methacrylate (e.g. SR379); glycidyl acrylate; carboxyl-modified multi-functional epoxy acrylate and/or multifunctional epoxy methacrylate (e.g. as disclosed in U.S. Pat. No. 4,789,620); acrylated epoxy silicones (e.g. as disclosed in UK-A-2067210); a cationic acrylate monomer of formula $CH_2CHCO_2CH_2CH_2NR_3X$ (where each R is $C_{1-4}$ alkyl or H, and X is a halogen ion, sulphate ion, nitrate ion, phosphate ion, carboxylate ion or sulfonate ion, e.g. as disclosed in JP Patent 04356509); neopentyl glycol diglycidyl ether; 1,4-butanediol diglycidy ether; cyclohexanedimethanol diglycidyl ether; polypropylene glycol diglycidyl ether; dibromo neopentyl glycol diglycidyl ether; trimethylolpropane triglycidyl ether; propoxylated glycerine triglycidyl ether; sorbitol polyglycidyl ether; caprolactone modified phenoxy resin; epoxy BD 600E and Epoxy BD 605E (Sartomer); and cyracure cycloaliphatic epoxide resins (e.g. UVR-6110, 6105, 6107, 6128, 6000, 6100 and 6216 from Dow).

Examples of cationic polymerisation initiators that could be used as component (b) include: triarylsulfonium salts (e.g. hexafluoroantimonate, hexafluorophosphate, tetrafluoroborate, hexafluoroarsenate, trifluoromethanesulfonate, and 9,10-dimethoxyantrasulfonate salts); diaryliodonium salts (e.g. tetrafluoroborate, hexafluorophosphate, hexafluoroarsenate, hexafluoroantimonate, trifluoromethanesulfonate, and 9,10-dimethoxyantrasulfonate salts); ferrocenium salts; and azoisobutyronitrile (AIBN).

The cationic photopolymerisation initiating material (b) may thus be an initiating material which can initiate the polymerisation of the cationic polymerisable compound under the action of light or heat.

Polymerisation may otherwise be induced by radiation free-radical initiation. Typical radiation free-radical initiated compositions include a photoinitiator in the composition. The photoinitiator is generally present in an amount ranging from about 0.1 to about 10 weight % of the composition. Examples of suitable photoinitiators include, but are not limited to, vicinal ketaldonyl compounds (i.e. compounds containing a ketone group and an aldehyde group), 2,2-dimethoxy-2-phenyl acetophenone, xanthone, fluorenone, benzophenone, camphorquinone, anthraquinone, bisimidazole, perfluorinated diphenyl titanocene, 3-methyl acetophenone, 4-chlorobenzophenone, 4,4'-dimethoxy benzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropane-1-one, p,p-bis[(triphenylphosphono)methyl]benzophenone salt, thioxanthone, diethylthioxanthone, 2-isopropylthioxanthone, 2-chlorothioxanthone, 2-methyl-1-(4-(methylthio)phenyl)-2-morpholinopropane-1-one, 1-hydroxycyclohexylphenyl ketone (e.g. IRGACURE 184 from Ciba Specialty Chemicals), diphenyl (2,4,6-trimethylbenzoyl)phosphine oxide (e.g. Lucirin TPO from BASF), 2-hydroxy-2-methyl-1-phenyl-1-propanone (e.g Darocur 1173 from Ciba Specialty Chemicals), etc.

Radiation free-radical curable composition according to the invention will preferably comprise a (meth)acrylate monomer and (meth)acrylate terminated oligomer.

Thermo polymerization may be induced by free radical initiation. Typical free radical initiators include azo compounds such as 4,4'-azobis(4-cyanovaleric acid), peroxides such as hydrogen peroxide and t-butyl hydroperoxide, peroxocarbonates, persulfates such as ammonium persulfate, potassium persulfate and sodium persulfate, photoinitators based on benzoin ethers and their derivatives, and also redox initiators including persulfates with bisulfate, such as sodium persulfate with sodium metabisulfite, hydrogen peroxide with ferrous ion, sulfite ion, bisulfite ion or ascorbic acid, and hydroperoxides with sulfoxylates, such as t-butyl hydroperoxide with sodium formaldehyde sulfoxylate. The concentration of the initiator is generally within the range of about 0.01% to about 3% by weight.

Initiators which can be employed for free-radical polymerization include peroxo and/or azo compounds, examples being alkali metal and ammonium peroxodisulfates, dibenzoyl peroxide, tert-butyl perpivalate, tert-butyl per-2-ethylhexanoate, di-tert-butyl peroxide, tert-butyl hydroperoxide, azobisisobutyronitrile, azobis(2-amidinopropane) dihydrochloride and 2,2'-azobis(2-methylbutyronitrile). Also suitable are initiator mixtures or redox initiator systems, such as ascorbic acid/iron(II) sulfate/sodium peroxodisulfate, tert-butyl hydroperoxide/sodium disulfite, tert-butyl hydroperoxide/sodium hydroxymethanesulfinate. Such initiators will typically be employed in amounts of for example from 0.05 to 5% by weight.

Thermo free-radical curable composition according to the invention will preferably comprise a (meth)acrylate monomer and (meth)acrylate terminated monomer and oligomer.

In the compositions of the invention, there is preferably a photoinitiator system selected from the group consisting of:

(i) a first photoinitiator capable of simultaneously generating a radical species that activates radical polymerisation and a Bronsted acid or Lewis acid that activates cationic polymerization, upon exposure to actinic radiation and (ii) a second photoinitiator system comprising a radical polymerisation photoinitiator, capable of initiating polymerisation upon exposure to actinic radiation, as well as a cationic polymerisation photoinitiator capable of generating a Bronsted acid or Lewis acid that activates cationic polymerisation upon exposure to actinic radiation and a spectral sensitiser that sensitises the first photoinitiator or second photoinitiator.

The composition used in certain preferred embodiments of the present invention comprises:

a) A cationic polymerisable prepolymer and a radical polymerisable prepolymer.

b) A cationic polymerisation initiating material.

c) A radical polymerisation initiating material.

The cationic polymerisation initiating material used in this preferred embodiment of the present invention may initiate the polymerisation of the cationic polymerisable prepolymer by action of light or heat. The particularly preferred cationic photopolymerisation initiating materials to be used in the present invention include diaryl iodonium salts, triaryl sulfonium salts and iron-allene complexes.

The term initiating material used above means a sensitiser used in combination with an active radical generating compound or an acid generating compound. When transparency is required, cyanine dyes disclosed in JP58-29803 and 1-287105 and JP3-5569 are preferably used. Examples of such cyanine dye include anhdyro-3,3'-dicarboxymethyl-9-ethyl-2,2'-thiacarbocyanine betaine, and anhydro-3-carboxymethyl-3',9'-diethyl2,2'-thiacarbocyanine betaine.

As the active radical generating compound, which may be used in combination with the cyanine dye when high photosensitivity is required, it is particularly preferred to use diaryl idonium salts. Examples of such salts include chloride, bromide, tetrafluoroborate, hexafluorophosphate, hexfluoroaresenate, hexafluoroantimonate, trifluoromethanesulfonate and 9,10-dimethyloxyanthracene-2-sulfonate of diphenyl iodonium.

The invention will now be described further with reference to the following non-limiting Examples and the accompanying drawing in which.

Figure 1:
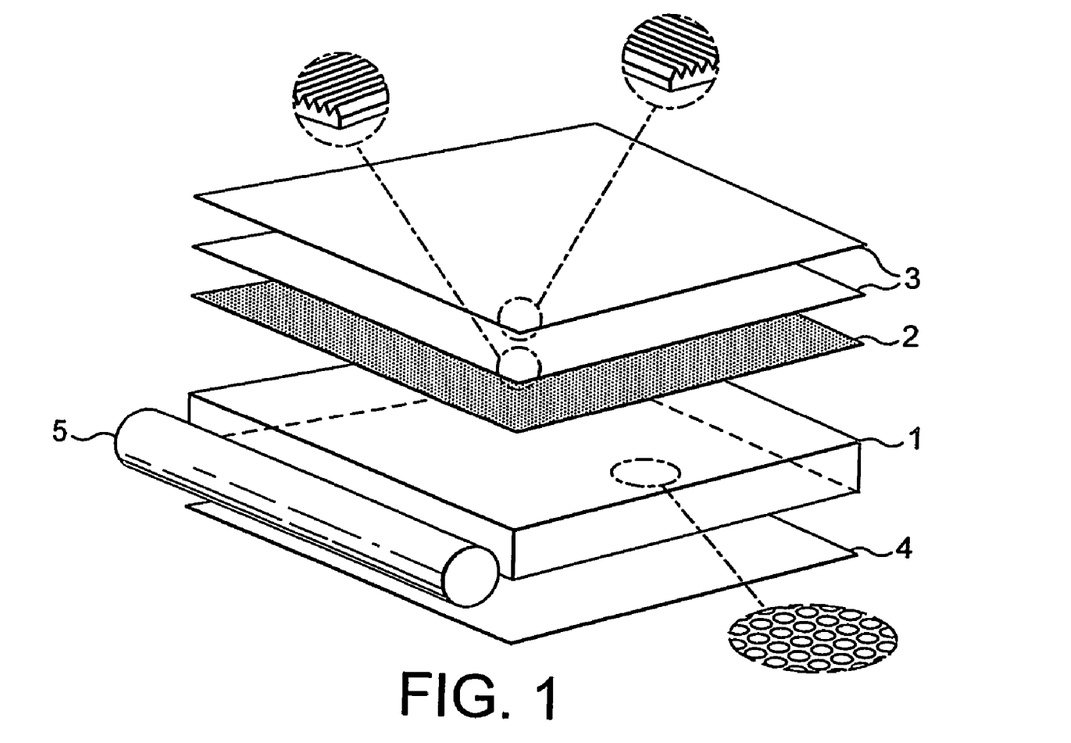
FIG. 1 is a schematic exploded diagram of a backlit liquid crystal optical display screen.

Referring to FIG. 1 there is shown a laminar LCD comprising a backlit light guide 1 of which the bottom surface is provided with dotted spots, a diffuser film 2, surface textured films 3 (i.e. of polymers according to the invention), a reflective film 4 and a fluorescent lamp 5. The figure is taken from Okumura et al., Applied Physics Letters 83: 2515 (2003). The surface-texture on films 3 may be produced for example as described in U.S. Pat. No. 4,542,449.

Refractive index was measured at 25° C. (unless otherwise stated) using an Atago 4T Abbe refactometer. Viscosity was measured at 25° C. using a Brookfield Programmable DV-II viscometer model SC4-31, No. 3 spindle, speed 20 rpm.

ACMO (acryloyl morphine) was obtained from Rahn, Sartomer 349 (ethoxylated (3) bisphenol A diacrylate) from Cray Valley, TPP (triphenyl phosphine) from Aldrich, triphenylphosphate from Aldrich, triphenylantimony from Aldrich, triphenylbismuthine from Aldrich, BR-31 (brominated acrylate monomer) from Daiichi Kogyo Seiyaku Co. Ltd. Japan, TBBDA (tetrabromobisphenol A ethoxylate (1-EO/phenol) diacrylate) from Aldrich, Sartomer CN104 (a difunctional Bisphenol A epoxy acrylate) from Cray Valley, and Darocur 1173 (2-hydroxy-2-methyl-1-phenyl-1-propanone) from Ciba Specialty Chemicals.

EXAMPLE 1

Polymerizable Formulation

A formulation was prepared by mixing

| | |
|---|---|
| Sartomer 349 | 44% wt |
| CN104 | 25% wt |
| ACMO | 7.5% wt |
| Darocur 1173 | 6% wt |
| TBBDA | 7.5% wt |
| Methylstyrene | 5% wt |
| Triphenylphosphine | 5% wt |

100 μm Melinex 506 was placed on a glass plate for use as a substrate. A 50 μm Mylar template was placed on the substrate. The formulation was added. A 100 μm Mylar cover sheet was placed over and a roller was used to spread the formulation within the template. The laminar structure was placed, Mylar side up, 150 mm below a non-collimated UV light source (intensity 46-49 mW/cm$^2$ at 300-400 nm as measured using an international light meter), for an exposure period of 5 seconds in stationary mode. A clear, UV-cured film was produced with a refractive index of 1.5720.

EXAMPLE 2

Polymerizable Formulation

An optical lacquer was prepared in a 50 ml brown glass jar by blending the components of Example 1. The lacquer was heated to 50° C. and stirred until all solid dissolved. A polymer film was prepared by UV curing for a curing time of 6 seconds. The refractive index of the liquid lacquer and cured polymer were measured at 23° C. as 1.5580 and 1.582, respectively.

EXAMPLE 3

Polymerizable Formulation

An optical lacquer was prepared as in Example 2 by blending of 20 g of TPP, 35 g of Sartomer 349, 5 g of methylstyrene, 20 g of CN104, 15 g of BR-31 and 5 g of Darocur 1173. A polymer film was prepared by UV curing for a curing time of 6 seconds. The refractive index of the liquid lacquer and cured polymer at 23° C. were measured as 1.5690 and 1.6010, respectively.

EXAMPLE 4

Polymerizable Formulation

An optical lacquer was prepared as in Example 2 by blending of 15 g of triphenyl phosphite, 35 g of Sartomer 349, 5 g of methylstyrene, 25 g of CN104, 15 g of BR-31 and 5 g of Darocur 1173. A polymer film was prepared by UV curing for a curing time of 6 seconds. The refractive index of the liquid lacquer and cured polymer were measured at 23° C. as 1.5590 and 1.5810, respectively.

EXAMPLE 4 (Comparative)

Polymerizable Formulation

A brown bottle was charged with acryloyl morpholine ACMO 22 wt %, Sartomer 349 55.5 wt %, CN104 15.5 wt % and Darocur 1173 7 wt %. The CN104 was heated (40° C.) to aid in its addition to the formulation. The formulation was coated onto a 100 micron PET substrate in the space defined by a 100 μm template. A 50 micron cover sheet through which UV exposure was conducted was then placed on top. Curing was conducted under a UV 2 kW metal halide lamp for 5 seconds. The distance between the lamp and the sample being cured was 150 mm. Following UV-curing the top cover sheet and bottom substrate were removed and the sample was cut to the appropriate size for refractive index measurement on an Atago 4T Abbe Refractometer.

EXAMPLE 5

Polymerizable Formulation

A brown bottle was charged with ACMO 20 wt %, Sartomer 349 50 wt %, CN104 14 wt %, triphenylphosphine 10 wt % and Darocur 1173 6 wt %. The contents of the bottle were heated and stirred in a water bath (40-50° C.) to aid mixing. The formulation was then cooled to room temperature before coating onto a 100 micron PET substrate and curing as in Example 4.

EXAMPLE 6

Polymerizable Formulation

A brown bottle was charged with ACMO 20 wt %, Sartomer 349 50 wt6, CN104 14 wt %, triphenylantimony 10 wt % and Darocur 1173 6 wt %. The contents of the bottle were heated and stirred in a water bath (40-50° C.) to aid mixing. The formulation was then cooled to room temperature before coating onto a 100 micron PET substrate and curing as in Example 4.

EXAMPLE 7

Polymerizable Formulation

A brown bottle was charged with ACMO 20 wt %, Sartomer 349 50 wt %, CN104 14 wt %, triphenylbismuthine 10 wt % and Darocur 1173 6 wt %. The contents of the bottle were heated and stirred in a water bath (40-50° C.) to aid mixing. The formulation was then cooled to room temperature before coating onto a 100 micron PET substrate and curing as in Example 4.

EXAMPLE 8

Polymerizable Formulation

A brown bottle was charged with ACMO 17.9 wt %, Sartomer 349 44.6 wt %, CN104 12.5 wt %, triphenyl-phosphine 20 wt % and Darocur 1173 5 wt %. The contents of the bottle were heated and stirred in a water bath (40-50° C.) to aid mixing. The formulation when removed from the water bath began to gel. It was therefore kept in a dry oven at 40° C. prior to coating onto a 100 micron PET substrate and curing as in Example 4.

EXAMPLE 9

Polymerizable Formulation

A brown bottle was charged with ACMO 14 wt %, Sartomer 349 36 wt %, CN104 10 wt %, triphenylantimony 36 wt % and Darocur 1173 4 wt %. The contents of the bottle were heated and stirred in a water bath (40-50° C.) to aid mixing. The formulation when removed from the water bath began to crystallise. It was therefore kept in a dry oven at 40° C. prior to coating onto a 100 micron PET substrate and curing as in Example 4.

EXAMPLE 10

Polymerizable Formulation

A brown bottle was charged with ACMO 15 wt %, Sartomer 349 37.5 wt %, CN104 10.5 wt %, triphenyl-bismuthine 32 wt %. and Darocur 1173 5 wt %. The contents of the bottle were heated and stirred in a water bath (40-50° C.) to aid mixing. The formulation when removed from the water bath began to gel. It was therefore kept in a dry oven at 40° C. prior to coating onto a 100 micron PET substrate and curing as in Example 4.

EXAMPLE 11 (Comparative)

Polymerizable Formulation

A brown bottle was charged with ACMO 7.8 wt %, Sartomer 349 46.5 wt %, CN104 26.4 wt %, TBBDA 7.8 wt %, methyl styrene 5.2 wt % and 2-hydroxy-2-methyl-1-phenyl-1-propanone Darocur 1173 6.3 wt %. The contents of the bottle were heated and stirred in a water bath (40-50° C.) to aid mixing. The formulation when removed from the water bath began to gel. It was therefore kept in a dry oven at 40° C. prior to coating onto a 100 micron PET substrate and curing as in Example 4.

EXAMPLE 12

Polymerizable Formulation

A brown bottle was charged with ACMO 7 wt %, Sartomer 349 41.9 wt %, CN104 23.8 wt %, TBBDA 7 wt %, methyl styrene 4.7 wt %, triphenyl-phosphine 10 wt % and Darocur 1173 5.7 wt %. The contents of the bottle were heated and stirred in a water bath (40-50° C.) to aid mixing. The formulation when removed from the water bath began to gel. It was therefore kept in a dry oven at 40° C. prior to coating onto a 100 micron PET substrate and curing as in Example 4.

EXAMPLE 13

Polymerizable Formulation

A brown bottle was charged with ACMO 7 wt %, Sartomer 349 41.9 wt %, CN104 23.8 wt %, TBBDA 7 wt %, methyl styrene 4.7 wt %, triphenyl-antimony 10 wt % and Darocur 1173 5.7 wt %. The contents of the bottle were heated and stirred in a water bath (40-50° C.) to aid mixing. The formulation when removed from the water bath began to increase in viscosity. It was therefore kept in a dry oven at 40° C. prior to coating onto a 100 micron PET substrate and curing as in Example 4.

EXAMPLE 14

Polymerizable Formulation

A brown bottle was charged with ACMO 6.3 wt %, Sartomer 349 37 wt %, CN104 21 wt %, TBBDA 6.3 wt %, methyl styrene 4.2 wt %, triphenylantimony 20 wt % and Darocur 1173 5 wt %. The contents of the bottle were heated and stirred in a water bath (40-50° C.) to aid mixing. The formulation when removed from the water bath began to increase in viscosity. It was therefore kept in a dry oven at 40° C. prior to coating onto a 100 micron PET substrate and curing as in Example 4.

EXAMPLE 15

Polymerizable Formulation

A brown bottle was charged with ACMO 5.5 wt %, Sartomer 349 32.4 wt %, CN104 18.4 wt %, TBBDA 5.5 wt %, methyl styrene 3.7 wt %, triphenylantimony 30 wt % and Darocur 1173 4.4 wt %. The contents of the bottle were heated and stirred in a water bath (40-50° C.) to aid mixing. The formulation when removed from the water bath began to increase in viscosity. It was therefore kept in a dry oven at 40° C. prior to coating onto a 100 micron PET substrate and curing as in Example 4.

Films were prepared from the formulations of Examples 4 to 15 by placing a 100 μm template on a 100 μm PET substrate, adding the formulation to the exposed substrate surface, covering with a 50 μm PET cover sheet, and irradiating with UV light through the cover sheet. The measured refractive indices are set out in Table 1 below.

TABLE 1

| Example | Refractive Index | Temperature/° C. |
|---|---|---|
| Example 4 Liquid | 1.539 | 19.3 |
| Example 4 Solid | 1.562 | 19.6 |
| Example 5 Liquid | 1.550 | 27.8 |
| Example 5 Solid film | 1.572 | 27.8 |
| Example 6 Liquid | 1.552 | 13.6 |
| Example 6 Solid film | 1.573 | 14.0 |
| Example 7 Liquid | 1.551 | 16.4 |
| Example 7 Solid film | 1.574 | 16.5 |
| Example 8 Liquid | 1.5665 | 18.9 |
| Example 8 Solid | 1.5885 | 18.9 |
| Example 9 Liquid | 1.581 | 20.6 |
| Example 9 Solid film | 1.604 | 20.6 |
| Example 10 Liquid | 1.575 | 20.6 |
| Example 10 Solid film | 1.597 | 20.6 |
| Example 11 Liquid | 1.549 | 18.9 |
| Example 11 Solid film | 1.571 | 18.9 |
| Example 12 Liquid | 1.566 | 18.9 |
| Example 12 Solid film | 1.583 | 18.8 |
| Example 13 Liquid | 1.562 | 18.2 |
| Example 13 Solid film | 1.582 | 18.2 |
| Example 14 Liquid | 1.573 | 18.7 |
| Example 14 Solid film | 1.594 | 18.5 |
| Example 15 Liquid | 1.584 | 18.8 |
| Example 15 Solid film | 1.606 | 18.8 |

The invention claimed is:

1. A single phase, essentially solvent-free, polymerizable liquid composition comprising a polymerizable liquid with dissolved therein a weight fraction of 4% and above of an organophosphorus, organoantimony or organobismuth compound selected from the group consisting of triphenylphosohine, triphenylphosphite, triphenylphosphine oxide, triphenylphosphine sulfide, triphenylantimony and triphenylbismuth compounds, the composition being polymerizable under the action of an externally applied influence to produce a material having a refractive index of at least 1.55.

2. A composition as claimed in claim 1 wherein said compound is an organophosphorus compound.

3. A composition as claimed in claim 1 where said compound is an organoantimony compound.

4. A composition as claim 1 wherein said compound is an organobismuth compound.

5. A composition as claimed in claim 1 containing up to 60 wt % of said compound.

6. A composition as claimed in claim 1 wherein said polymerizable liquid contains an epoxy monomer or oligomer.

7. A composition as claimed in claim 1 wherein said polymerizable liquid contains an epoxy monomer or oligomer.

8. A process for the preparation of a polymer which process comprises obtaining a ploymerizable composition as claimed in claim 1 and subjecting it to irradiation with UV light so as to cause said composition to polymerize.

9. A polymer product in the form of a surface textured optical film, wherein said product is produced or producible by a process as claimed in claim 8.

10. An optical display panel comprising a polymer product as claimed in claim 9.

11. A composition as claimed in claim 1, wherein the compound is present in an amount of 5% wt.

12. A composition as claimed in claim 1, wherein the compound is present in an amount of from 5% to 20% wt.

13. A composition as claimed in claim 1, wherein the product has a refractive index of from 1.59 to 1.61.

* * * * *

UNITED STATES PATENT AND TRADEMARK OFFICE
CERTIFICATE OF CORRECTION

PATENT NO. : 7,632,880 B2  Page 1 of 1
APPLICATION NO. : 10/545963
DATED : December 15, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Twenty-first Day of December, 2010

David J. Kappos
*Director of the United States Patent and Trademark Office*